United States Patent
Kim et al.

(10) Patent No.: US 12,352,457 B2
(45) Date of Patent: Jul. 8, 2025

(54) AIR CONDITIONER

(71) Applicant: SAMSUNG ELECTRONICS CO., LTD., Suwon-si (KR)

(72) Inventors: Jungwon Kim, Suwon-si (KR); Sejoo Na, Suwon-si (KR); Moonsun Shin, Suwon-si (KR); Joonho Yoon, Suwon-si (KR); Woonghee Lee, Suwon-si (KR); Wonhee Lee, Suwon-si (KR); Jangjung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 17/869,103

(22) Filed: Jul. 20, 2022

(65) Prior Publication Data
US 2022/0357068 A1    Nov. 10, 2022

Related U.S. Application Data

(63) Continuation of application No. PCT/KR2021/001274, filed on Feb. 1, 2021.

(30) Foreign Application Priority Data

Feb. 5, 2020    (KR) .................. 10-2020-0013858

(51) Int. Cl.
F24F 11/89    (2018.01)
F24F 13/20    (2006.01)
F24F 110/64   (2018.01)

(52) U.S. Cl.
CPC ............ F24F 11/89 (2018.01); F24F 13/20 (2013.01); *F24F 2110/64* (2018.01)

(58) Field of Classification Search
CPC ......... F24F 11/89; F24F 13/20; F24F 2110/64
USPC ....................................................... 454/367
See application file for complete search history.

(56) References Cited

U.S. PATENT DOCUMENTS

| | | | |
|---|---|---|---|
| 9,885,602 B2* | 2/2018 | Matsunami | G01N 21/53 |
| 2012/0145010 A1* | 6/2012 | Yamamoto | F24F 8/108 |
| | | | 96/397 |
| 2020/0326093 A1* | 10/2020 | Patil | G01D 11/30 |

FOREIGN PATENT DOCUMENTS

| | | |
|---|---|---|
| EP | 2 180 264 A2 | 4/2020 |
| JP | 2002-186816 A | 7/2002 |
| JP | 6197449 B2 | 9/2017 |
| JP | 2018-179445 A | 11/2018 |

(Continued)

OTHER PUBLICATIONS

International Search Report issued in International Application No. PCT/KR2021/001274 dated May 24, 2021.

(Continued)

*Primary Examiner* — Avinash A Savani
*Assistant Examiner* — Dana K Tighe
(74) *Attorney, Agent, or Firm* — STAAS & HALSEY LLP

(57) ABSTRACT

An air conditioner including a sensor kit. The air conditioner includes: a cabinet including a first side having a first through hole and a second side having a second through hole; a pipe formed to pass through the first through hole; a sensor kit provided on the second side; and a controller to be electrically connected to the sensor kit, wherein the sensor kit includes: a sensor configured to sense a pollution level of outside air; and a cover formed to cover the second through hole on the second side, and fixing the sensor.

13 Claims, 16 Drawing Sheets

(56) References Cited

FOREIGN PATENT DOCUMENTS

| | | |
|---|---:|---:|
| JP | 6951858 B2 | 10/2021 |
| JP | 7004836 B2 | 1/2022 |
| KR | 20-1998-034316 U | 9/1998 |
| KR | 10-0491791 B1 | 5/2005 |
| KR | 20-2009-0012908 U | 12/2009 |
| KR | 10-1460716 B1 | 11/2014 |
| KR | 10-2018-0138366 A | 12/2018 |
| KR | 10-1936209 B1 | 1/2019 |
| KR | 10-2215862 B1 | 2/2021 |

OTHER PUBLICATIONS

International Written Opinion issued in International Application No. PCT/KR2021/001274 dated May 24, 2021.
Notice of Preliminary Rejection issued Dec. 9, 2024 for Korean Application No. 10-2020-0013858.

\* cited by examiner

AIR CONDITIONER

CROSS-REFERENCE TO RELATED APPLICATIONS

This application is a continuation application, under 35 U.S.C. § 111(a), of International Patent Application No. PCT/KR2021/001274, filed on Feb. 1, 2021, which claims the benefit of Korean Patent Application No. 10-2020-0013858, Feb. 5, 2020, in the Korean Intellectual Property Office, the entire disclosures of each of which are incorporated herein by reference as a part of this application.

BACKGROUND

Field

The present disclosure relates to an air conditioner, and more particularly, to an air conditioner including a sensor kit.

Description of Related Art

In general, an air conditioner is an apparatus for adjusting temperature, humidity, air current, distribution, etc. to conditions suitable for human activities by using a cooling cycle. Main components constituting the cooling cycle include a compressor, a condenser, an evaporator, and a blow fan.

Air conditioners are classified into a split type air conditioner in which an indoor unit is separated from an outdoor unit, and a window type air conditioner in which an indoor unit and an outdoor unit are installed together in a single cabinet. The indoor unit of the split type air conditioner includes a heat exchanger for heat-exchanging air sucked to the inside of the panel, and a blow fan for sucking indoor air to the inside of the panel and again discharging the sucked air to an indoor space.

An air conditioner includes a filter for purifying sucked air. The filter filters fine dust, etc. in the air and air filtered by the filter is discharged to an indoor space.

Also, the air conditioner includes a sensor for sensing outside fine dust, etc. in order to efficiently perform an air conditioning function.

SUMMARY

An air conditioner according to a concept of the disclosure includes: a cabinet including a first side having a first through hole and a second side having a second through hole; a pipe formed to pass through the first through hole; a sensor kit provided on the second side; and a controller to be electrically connected to the sensor kit, wherein the sensor kit includes: a sensor configured to sense a pollution level of outside air; and a cover formed to cover the second through hole on the second side, and fixing the sensor.

The cover may include an accommodating space formed inside the cover to accommodate the sensor.

The accommodating space of the cover may be positioned outside the cabinet.

The accommodating space of the cover may be surrounded by the second side and the cover.

The accommodating space of the cover may be formed to be connected with an inside of the cabinet through the second through hole.

The sensor kit may further include a holder formed to fix the cover to the second side, and the holder may include an accommodating space formed inside the holder to accommodate the sensor.

The accommodating space of the cover may be positioned inside the cabinet.

The accommodating space of the cover may be surrounded by the cover and the holder.

The holder may be positioned inside the cabinet and coupled with the cover.

The sensor kit may further include a holder formed to fix the cover to the second side, and the holder may include a communicating hole formed in one side of the holder.

The cover may include a coupling portion formed to pass through the second through hole, and the holder may be positioned inside the cabinet and coupled with the coupling portion.

The coupling portion may include a coupling rib formed to be inserted in a coupling hole formed in the holder, and the holder may be formed to be coupled with the coupling rib by rotating on a central axis of the holder.

The coupling portion may include a screw thread corresponding to the holder, and the holder may be formed to be coupled with the screw holder by rotating on the central axis of the holder.

The sensor kit may further include a sensor housing formed to accommodate the sensor, and the sensor housing may be fixed to the cover.

The cover may include a fixing magnet by which the cover is attachable on and detachable from on the second side.

The first side and the second side may face each other, and the first through hole may be symmetrical to the second through hole.

The sensor may be electrically connected to the controller by a wire passing through the communicating hole.

In another aspect of the disclosure, an air conditioner according to a concept of the disclosure includes: a cabinet, wherein a through hole is formed in one side of the cabinet; a sensor kit formed to be fixed to the one side of the cabinet; and a controller configured to transmit/receive a signal to/from the sensor kit, wherein the sensor kit includes: a cover, wherein an inlet opening is formed in one side of the sensor kit, and a flow path formed to connect the through hole to the inlet hole is provided; and a sensor positioned on the flow path and being in contact with outside air flowing along the flow path.

The sensor may be adjacent to the inlet opening, and spaced from the one side of the cabinet.

The sensor may be installed in the sensor housing, and the sensor housing may be formed to be coupled with an inner surface of the cover such that the sensor is adjacent to the inlet opening and spaced from the one side of the cabinet.

DETAILED DESCRIPTION

Figure 1:
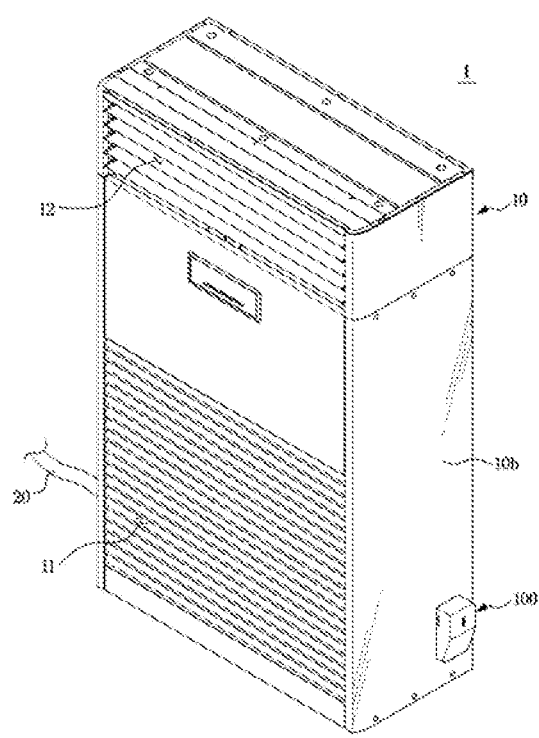
FIG. 1 shows an air conditioner according to an embodiment of the disclosure.

Configurations illustrated in the embodiments and the drawings described in the present specification are only the preferred examples of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are used for describing the embodiments, not for the purpose of limiting and/or restricting the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

The disclosure provides an air conditioner including a sensor kit for sensing a pollution level of outside air.

The disclosure provides an air conditioner including a sensor kit which is separately manufactured and sold and then installed in the air conditioner.

According to a concept of the disclosure, there is provided an air conditioner including a sensor for sensing a pollution level of outside air to adjust an operation of the air conditioner according to the pollution level of the outside air, thereby efficiently performing an air conditioning function.

According to a concept of the disclosure, there is provided an air conditioner including a sensor kit which is installed in a through hole from which a pipe is pulled out, without any structural change, such that the sensor kit is capable of being installed in an existing air conditioner including no sensor.

Hereinafter, an embodiment of the disclosure will be described in detail with reference to the accompanying drawings.

A cooling cycle constituting an air conditioner may be configured with a compressor, a condenser, an expansion valve, and an evaporator. The cooling cycle may perform a series of processes of compression-condensation-expansion-evaporation to heat-exchange high-temperature air with low-temperature refrigerants and then supply low-temperature air to an indoor space.

The compressor may compress a refrigerant gas to a high-temperature, high-pressure state, and discharge the compressed refrigerant gas to the condenser. The condenser may condense the compressed refrigerant gas to a liquid state, and emit heat to the surroundings during the condensing process. The expansion valve may expand the liquid-state refrigerants in the high-temperature, high-pressure state condensed by the condenser to liquid-state refrigerants in a low-pressure state. The evaporator may evaporate the refrigerants expanded by the expansion valve. The evaporator may achieve a cooling effect through heat-exchange with an object to be cooled using evaporative latent heat of refrigerants, and return the refrigerant gas in the low-temperature, low-pressure state to the compressor. Through the cycle, the temperature of air of an indoor space may be adjusted.

An outdoor unit of the air conditioner may be a part of the cooling cycle, configured with the compressor and an outdoor heat exchanger. The expansion valve may be installed in any one of the outdoor unit and an indoor unit, and an indoor heat exchanger may be installed in the indoor unit of the air conditioner.

The disclosure relates to an air conditioner for cooling an indoor space, wherein an outdoor heat exchanger may function as a condenser and an indoor heat exchanger may function as an evaporator. Hereinafter, for convenience of description, the indoor unit including the indoor heat exchanger is referred to as an air conditioner, and the indoor heat exchanger is referred to as a heat exchanger.

Figure 2:
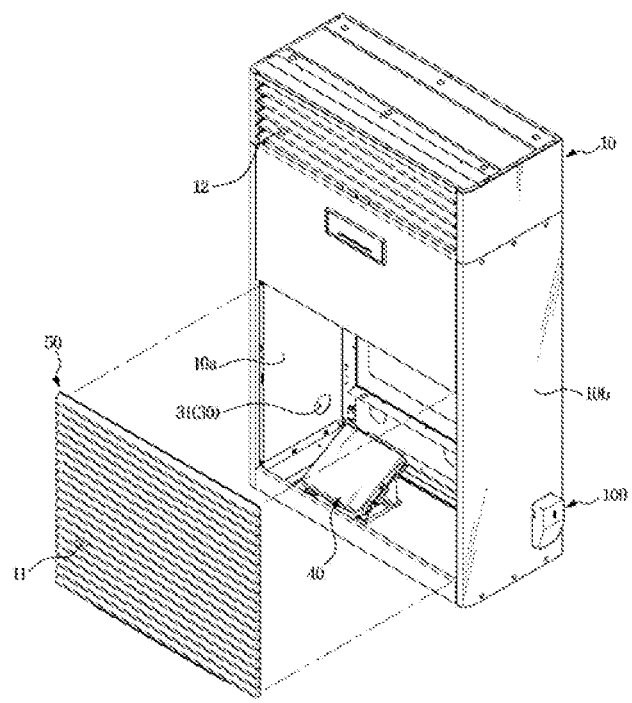
FIG. 2 is an exploded view of the air conditioner shown in FIG. 1 according to an embodiment of the disclosure.
Figure 3:
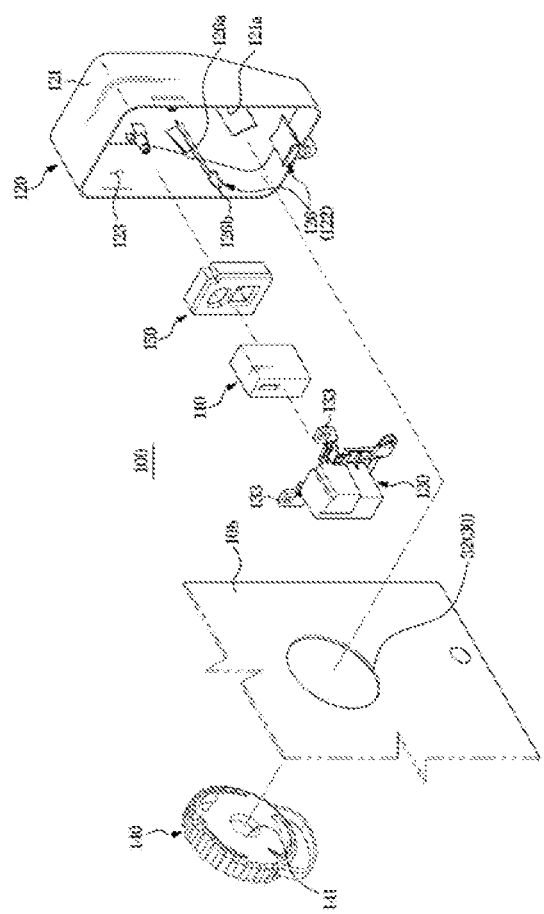
FIG. 3 is an exploded perspective view of a sensor kit shown in FIG. 1 according to an embodiment of the disclosure.
Figure 4:
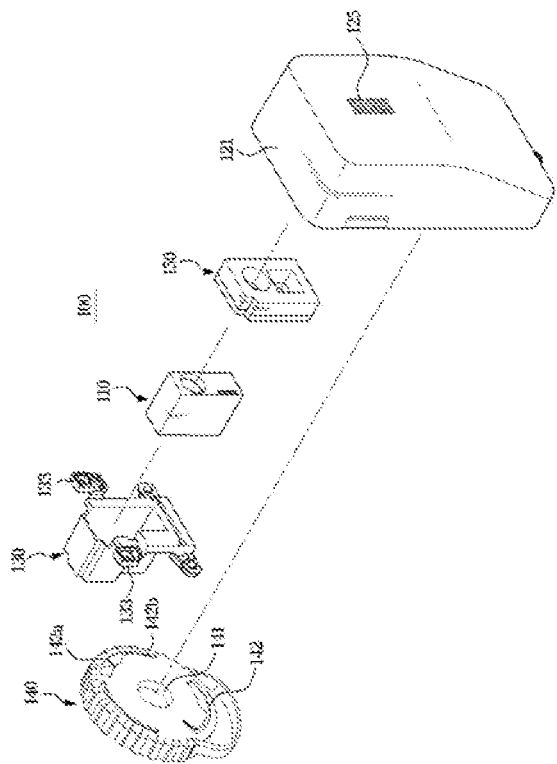
FIG. 4 is an exploded perspective view showing the sensor kit shown in FIG. 3 at another angle while omitting a cabinet according to an embodiment of the disclosure.
Figure 5:
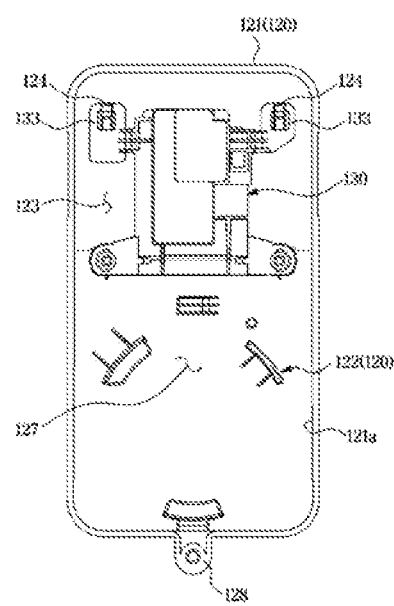
FIG. 5 shows an inside of the sensor kit shown in FIG. 1 according to an embodiment of the disclosure.

FIG. 1 shows an air conditioner according to an embodiment of the disclosure. FIG. 2 is an exploded view of the air conditioner shown in FIG. 1. FIG. 3 is an exploded perspective view of a sensor kit shown in FIG. 1. FIG. 4 is an exploded perspective view showing the sensor kit shown in FIG. 3 at another angle while omitting a cabinet. FIG. 5 shows an inside of the sensor kit shown in FIG. 1.

An air conditioner 1 shown in FIG. 1 is a stand type air conditioner, although not limited thereto.

Referring to FIGS. 1 to 5, the air conditioner 1 may include a cabinet 10 having an inlet 11 and an outlet 12. In both sides 10a and 10b of the cabinet 10, a through hole 30 from which a refrigerant pipe 20 is pulled out may be formed.

The cabinet 10 may include an inlet grill 50 in which the inlet 11 is formed, and the inlet grill 50 may be detachably provided in a front side of the cabinet 10. In the inlet grill 50, a filter (not shown) may be provided.

The air conditioner 1 may include the refrigerant pipe 20. The refrigerant pipe 20 may be a pipe connecting the indoor unit 1 to an outdoor unit (not shown) such that a refrigerant circulates through a cooling cycle (not shown) to perform air conditioning. The refrigerant pipe 20 may be pulled out from the indoor unit by passing through the through hole 30, and connected to the outdoor unit (not shown).

As shown in FIGS. 1 to 3, the through hole 30 may include a first through hole 31 and a second through hole 32 that are respectively formed in lower end portions of a first side 10a and a second side 10b being opposite sides of the cabinet 10. Accordingly, the refrigerant pipe 20 may be pulled out from the cabinet 10 by passing through any one through hole 30 of the first through hole 31 and the second through hole 32, from which the pipe 20 can be easily pulled out, according to an installation location of the air conditioner 1, although not limited thereto. However, the first through hole 31 and the second through hole 32 may be respectively formed in two sides of the cabinet 10, which are not opposite to each other, or three or more through holes 30 may be formed.

In other words, the through hole 30 may be a pipe outlet 30 formed in the cabinet 10 for the purpose of pulling out the refrigerant pipe 20 from an inside of the cabinet 10. Accordingly, an existing air conditioner may also have the through hole 30 as a pipe outlet. The through hole 30 may include a plurality of through holes 31 and 32 to prevent a case in which the refrigerant pipe 20 cannot be pulled out according to a location in an indoor space where the air conditioner 1 is installed. The plurality of through holes 31 and 32 may be formed symmetrically in two opposite sides of the cabinet 10. The through hole 30 may be closed by a blocking plate being in a shape of a plate upon being manufactured, and a user may remove the blocking plate from the through hole 30 by pressing the blocking plate in a direction that is perpendicular to the blocking plate.

Hereinafter, a case in which the refrigerant pipe 20 is pulled out through the first through hole 31 formed in the first side 10a of the cabinet 10 will be described. In FIG. 2, the refrigerant pipe 20 passing through the first through hole 31 is not shown.

The second through hole 32 formed in the second side 10b of the cabinet 10 may be a through hole 30 from which the refrigerant pipe 20 is not pulled out, although not limited thereto. However, the refrigerant pipe 20 may be pulled out through the second through hole 32. In this case, the first through hole 31 may be a through hole 30 from which the refrigerant pipe 20 is not pulled out.

The air conditioner 1 may include a controller 40 for interpreting a driving command and driving the air conditioner 1 according to the driving command. The controller 40 may be installed inside the cabinet 10.

The controller 40 may be electrically connected to a sensor kit 100 which will be described below, and transmit/receive a signal to/from the sensor kit 100. More specifically, the controller 40 may be electrically connected to a sensor 110 of the sensor kit 100 by a general wire, and transmit/receive a signal to/from the sensor 110, although not limited thereto. However, the controller 40 may transmit/receive a signal to/from the sensor 110 wirelessly.

The controller 40 may drive the air conditioner 1 by interpreting information transmitted from the sensor 110 of the sensor kit 100.

The air conditioner 1 may include the sensor kit 100 including the sensor 110. The sensor kit 100 may be fixed to one side of the cabinet 10. More specifically, as shown in the drawings, the sensor kit 100 may be provided on the second side 10b by being coupled with the second through hole 32, although not limited thereto. In a case in which the refrigerant pipe 20 is pulled out through the second through hole 32, the sensor kit 100 may be provided on the first side 10a by being coupled with the first through hole 31. That is, the sensor kit 100 may be installed in a through hole 30 from which the refrigerant pipe 20 is not pulled out.

As such, because the sensor kit 100 is coupled with the remaining through hole 30 except for a through hole 30 from which the refrigerant pipe 20 is pulled out, according to a location of the air conditioner 1, the sensor kit 100 may be easily installed without a structural change of the air conditioner 1. Also, the sensor kit 100 may be manufactured and sold as a separate product independently from the air conditioner 1, and accordingly, the sensor kit 100 may be separately purchased and then installed in an existing air conditioner including no sensor 110 to include a sensor in the air conditioner.

Hereinafter, a case in which the sensor kit 100 is provided on the second side 10b by being coupled with the second through hole 32 of the cabinet 10 will be described. However, the following description may also be applied in the same way to a case in which the sensor kit 100 is provided on the first side 10a by being coupled with the first through hole 31 of the cabinet 10.

The sensor kit 100 may include a cover 120 forming an outer appearance. The cover 120 may be coupled with the second through hole 32. More specifically, a portion of the cover 120 may be inserted into the second through hole 32 and coupled with the second through hole 32.

The cover 120 may include a cover portion 121 positioned on an outer surface of the second side 10b to cover the second through hole 32, and a coupling portion 122 inserted into the second through hole 32.

The cover portion 121 may form an accommodating space 123 in which the sensor 110 is accommodated. In one side of the cover portion 121, an inlet opening 125 may be provided to allow outside air to flow to the sensor 110. An opening 121a may be formed in one side of the cover portion 121. More specifically, one side that is opposite to the inlet opening 125 may open, and the accommodating space 123 may be exposed to outside at the one side in which the opening 121a is formed. Accordingly, because an easy access to the sensor 110 installed in the accommodating space 123 through the opening 121a is possible, the sensor 110 may be easily installed, replaced, and repaired.

The opening 121a of the cover portion 121 may be in contact with the second side 10b on the outer surface of the second side 10b. Accordingly, the accommodating space 123 in the cover portion 121 may communicate with the second through hole 32 and the inside of the cabinet 10 through the opening 121a. In other words, the accommodating space 123 may correspond to a flow path 123 connecting the inlet opening 125 to the second through hole 32.

The accommodating space 123 may be positioned between the cover 120 and the second side 10b. More specifically, the accommodating space 123 may be surrounded by the second side 10b and an inner surface of the cover portion 121 positioned on the outer surface of the second side 10b. In this case, because the second through hole 32 is positioned inside the opening 121a, the accommodating space 123 may communicate with the second through hole 32.

The coupling portion 122 may protrude from the inner surface of the cover portion 121. More specifically, the coupling portion 122 may further protrude from the inner surface of the cover portion 121 than the opening 121a. The coupling portion 122 may be inserted into the second through hole 32. A holder 140 may be coupled with the coupling portion 122 inserted into the second through hole 32, and thereby, the cover 120 may be coupled with the second through hole 32 and fixed on the second side 10b.

Because the sensor 110 is accommodated in the accommodating space 123 communicating with the inside of the cabinet 10 through the second through hole 32, a wire connecting the sensor 110 to the controller 40 may be inserted into the inside of the cabinet 10 through the second through hole 32 without having to perform a task of boring a hole in the cabinet 10 to insert the wire into the inside of the cabinet 10.

The sensor kit 100 may include the sensor 110 for sensing a pollution level of outside air and transferring information about the pollution level to the controller 40. More specifically, the sensor 110 may be a fine dust sensor 110 for sensing a pollution level of outside air by fine dust, although not limited thereto. However, the sensor 110 may be a sensor having another function, such as contrast detection, motion detection, compound detection, infrared light detection, etc.

The sensor 110 may be fixed on an inner surface of the cover 120. More specifically, the sensor 110 may be inserted into and fixed to a sensor housing 130, and the sensor housing 130 may be coupled with the cover 120 to fix the sensor 110 to the cover 120.

More specifically, a coupling hook 124 may be formed inside the cover portion 121, and a coupling groove 133 may be formed in the sensor housing 130. By inserting the coupling hook 124 into the coupling groove 133, the sensor housing 130 may be coupled with the inner surface of the cover portion 121, although not limited thereto. However, the sensor housing 130 may be fixed to the cover 120 by a screw, etc., without the coupling groove 133, or the sensor 110 may be fixed directly to the cover 120 by a screw, an adhesive, etc., without the sensor housing 130.

The sensor 110 may be installed in the accommodating space 123 formed inside the cover 120. In other words, the sensor 110 may be positioned on the flow path 123 connecting the inlet opening 125 to the second through hole 32. Outside air may enter the accommodating space 123 through the inlet opening 125, and the sensor 110 may be in contact with the outside air in the accommodating space 123. The sensor 110 may suck the outside air and measure a pollution level of the outside air.

The sensor 110 may be positioned adjacent to the inlet opening 125 and fixed at a higher location than a bottom of the cabinet 10. More specifically, the inlet opening 125, which is a hole penetrating one side of the cover 120, may be formed at the higher location than the bottom of the cabinet 110, and the sensor housing 130 may be fixed to the inner surface of the cover portion 121 such that the sensor 110 is positioned at a location corresponding to the inlet opening 125.

As such, because the sensor 110 is spaced from a floor of an indoor space where the air conditioner 1 is installed, it may be possible to prevent an error from being generated in a measurement result of a pollution level by the sensor 110, due to a factor such as dust, etc. existing on the floor of the indoor space.

Because the sensor housing 130 in which the sensor 110 is installed is fixed to the inner surface of the cover 120 without being directly coupled with the cabinet 10, the sensor 110 may be spaced from the second side 10b. Accordingly, the sensor 110 may be little influenced by vibrations of the cabinet 10.

The sensor kit 100 may include a sealing member 150 positioned between the inlet opening 120 and the sensor 110 to concentrate outside air entered the inlet opening 125 on the sensor 110.

Figure 6:
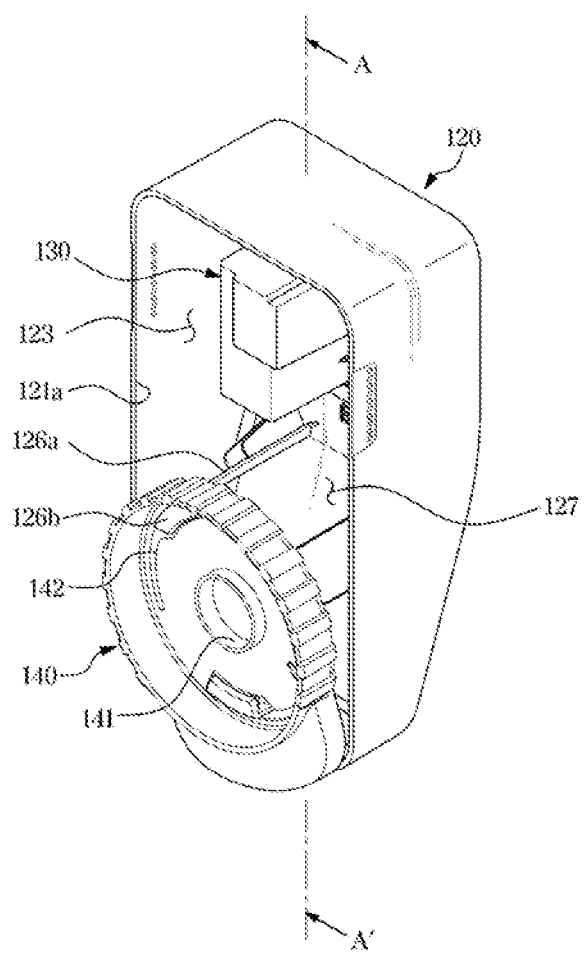
FIG. 6 shows a coupled state of components of the sensor kit shown in FIG. 4 according to an embodiment of the disclosure.
Figure 7:
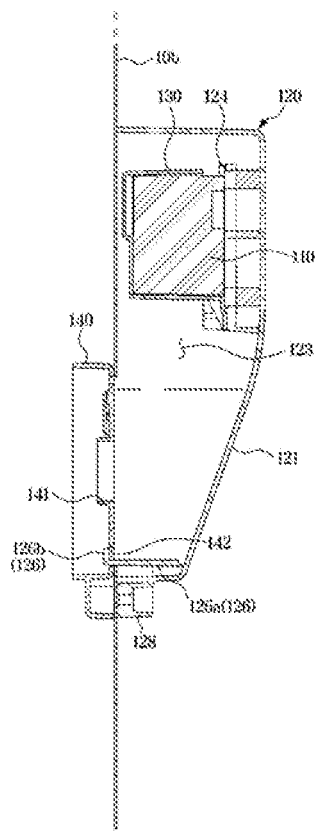
FIG. 7 is a side cross-sectional view of the sensor kit shown in FIG. 1, taken along auxiliary line A-A' shown in FIG. 6 according to an embodiment of the disclosure.
Figure 8:
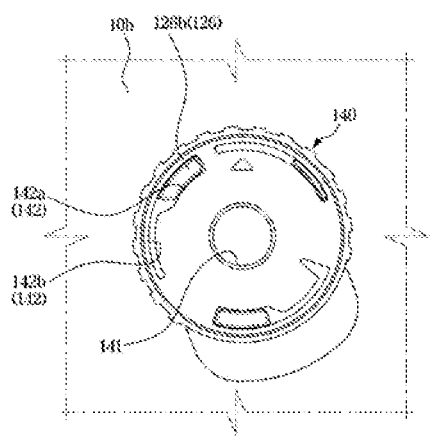
FIG. 8 shows a holder of the sensor kit shown in FIG. 1, the holder being in an unlocked state according to an embodiment of the disclosure.
Figure 9:
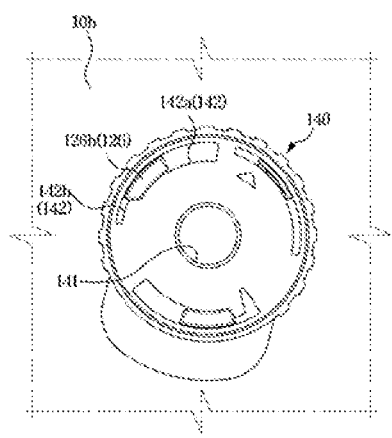
FIG. 9 shows the holder of the sensor kit shown in FIG. 1, the holder being in a locked state according to an embodiment of the disclosure.

FIG. 6 shows a coupled state of components of the sensor kit shown in FIG. 4. FIG. 7 is a side cross-sectional view of the sensor kit shown in FIG. 1, taken along auxiliary line A-A' shown in FIG. 6. FIG. 8 shows a holder of the sensor kit shown in FIG. 1, the holder being in an unlocked state. FIG. 9 shows the holder of the sensor kit shown in FIG. 1, the holder being in a locked state.

Referring to FIGS. 6 to 9, the sensor kit 100 may include a holder 140 for fixing the cover 120 to the second side 10b. In one side of the holder 140, a communicating hole 141 may be formed. The accommodating space 123 of the cover 120 may communicate with the inside of the cabinet 10 through the communicating hole 141. A wire for supplying power to the sensor 110 and transferring a signal to the controller 40 may pass through the communicating hole 141 and electrically connect the controller 40 to the sensor 110.

The holder 140 may be installed inside the cabinet 10, and coupled with the coupling portion 122 of the cover 120.

More specifically, the coupling portion 122 may include a coupling rib 126 inserted in the second through hole 32. The coupling rib 126 may include a plurality of coupling ribs 126. A connecting space 127 may be formed between the coupling ribs 126, and the accommodating space 123 may communicate with the inside of the cabinet 10 through the connecting space 127. Because the connecting space 127 corresponds to an area of the accommodating space 123, the accommodating space 123 may include the connecting space 127.

The coupling rib 126 may include a first extension portion 126a protruding from the inner surface of the cover portion 121, and a second extension portion 126b extending from an end of the first extension portion 126a and bent in a direction that is perpendicular to a protruding direction of the first extension portion 126a. The first extension portion 126a and the second extension portion 126b may be integrated into one body, although not limited thereto. However, some of the plurality of coupling ribs 126 may include only the first extension portion 126a.

In the holder 140, a coupling hole 142 corresponding to the coupling rib 126 may be formed. The coupling hole 142 may include a plurality of coupling holes 142 corresponding to the number of the coupling rib 126.

The coupling rib 126 may be inserted in the coupling hole 142. The coupling hole 142 may include a first portion 142a to pass both the first extension portion 126a and the second extension portion 126b therethrough, and a second portion 142b extending from the first portion 142a and having a smaller width than the first portion 142a to pass the first extension portion 142a therethrough without passing the second portion 142b therethrough, although not limited thereto. However, in a case in which the coupling rib 126 has only the first extension portion 126a, the coupling hole 142 corresponding to the coupling rib 126 may also have only the second portion 142b.

The coupling rib 126 may be inserted in the coupling hole 142 to pass through the first portion 142a of the coupling hole 142. In this case, the first portion 142a of the holder 140 may be penetrated by the first extension portion 126a, and the second extension portion 126b may pass through the coupling hole 142 and escape from the holder 140 to outside.

The holder 140 in which the coupling rib 126 is inserted in the first portion 142a may rotate in one direction on a central axis of the holder 140 to locate the coupling rib 126 to the second portion 142b. This state may be a locked state.

In this case, the second portion 142b of the holder 140 may be penetrated by the first extension portion 142a. Because the second portion 142b has a smaller width than that of the second extension portion 126b and the second extension portion 126b cannot pass through the second portion 142b, the sensor kit 100 may be fixed without departing from the second through hole 32 even though the sensor kit 100 is pulled to the outside of the second side 10b. Additionally, a fixing portion 128 for fixing the sensor kit 100 to one surface of the cabinet 10 by using a screw, etc. may be formed on a lower end of the cover 120.

The holder 140 may rotate in an opposite direction of the one direction on the central axis of the holder 140 to locate the coupling rib 126 penetrating the coupling hole 142 at the second portion 142b to the first portion 142a. This state may be an unlocked state.

In this case, the first portion 142a of the holder 140 may be penetrated by the first extension portion 126a. Because the first portion 142a has a width that is greater than or equal to that of the second extension portion 126b and the second extension portion 126b can pass through the first portion 142a, the holder 140 may be separated from the coupling rib 126, although not limited thereto.

Figure 10:
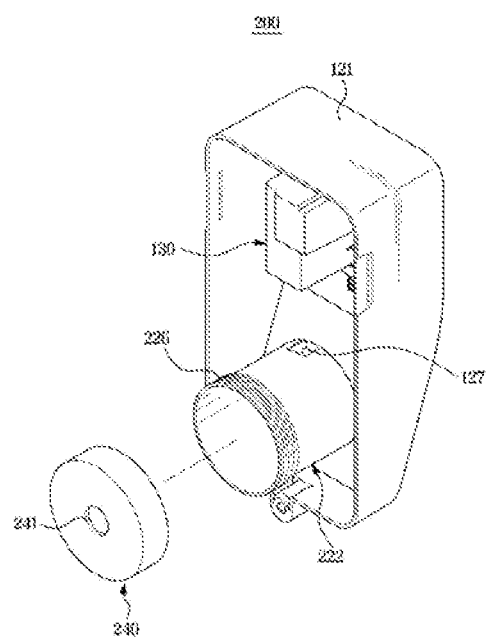
FIG. 10 shows a sensor kit of an air conditioner according to another embodiment of the disclosure according to an embodiment of the disclosure.

FIG. 10 shows a sensor kit of an air conditioner according to another embodiment of the disclosure. Referring to FIG. 10, a coupling portion 222 may include a screw thread 226 that is coupled with a holder 240.

The coupling portion 222 may be in a shape of a hollow pipe, and in one side of the coupling portion 222, the connecting space 127 may be formed. The connecting space 127 may be provided inside an opening penetrating the coupling portion 222. The wire connecting the sensor 110 to the controller 40 may arrive at a communicating hole 241 through the connecting space 127, pass through the communicating hole 241, and then be electrically connected to the controller 40 inside the cabinet 10.

The screw thread 226 may correspond to the holder 240. In an inner surface of the holder 240, a screw groove (not shown) may be formed to correspond to the screw thread 226. Therefore, by rotating the holder 240 in one direction on the central axis of the holder 240, the holder 240 may be coupled with the coupling portion 222 by the screw thread 226, and by rotating the holder 240 in the opposite direction of the one direction, the holder 240 may be separated from the coupling portion 222.

Figure 11:
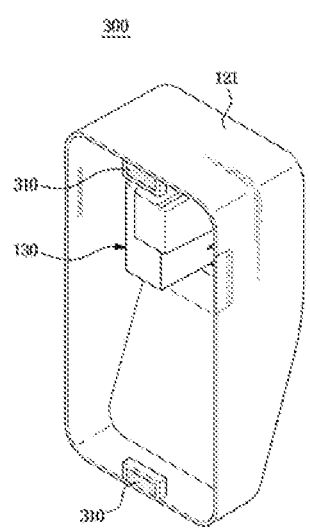
FIG. 11 shows a sensor kit of an air conditioner according to another embodiment of the disclosure according to an embodiment of the disclosure.
Figure 12:
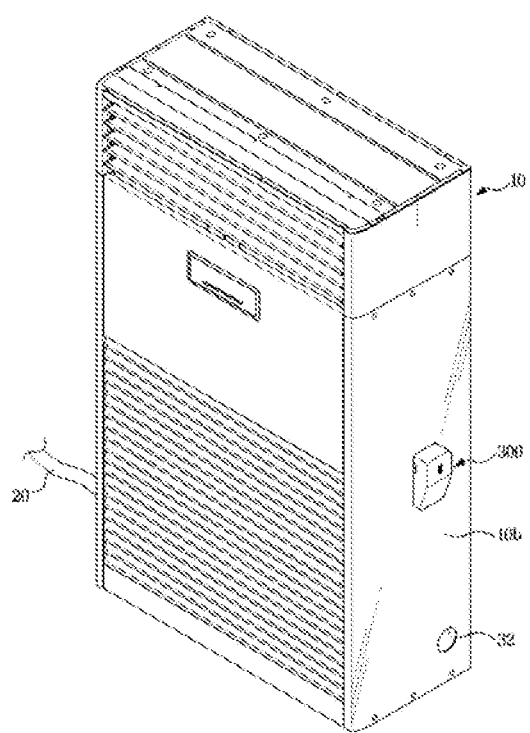
FIG. 12 shows a state in which the sensor kit shown in FIG. 11 is fixed to a second side according to an embodiment of the disclosure.

There may be another example. FIG. 11 shows a sensor kit of an air conditioner according to another embodiment of the disclosure. FIG. 12 shows a state in which the sensor kit shown in FIG. 11 is fixed to a second side.

Referring to FIGS. 11 and 12, a coupling portion may be omitted. In this case, a fixing magnet 310 may be provided in the cover portion 121. A sensor kit 300 may be movable on the second side 10b and detachably coupled with the second side 10b by the fixing magnet 310. Accordingly, the sensor kit 300 may cover the second through hole 32, similarly to FIG. 1, or the sensor kit 300 may be positioned at another location on the second side 10b, as in FIG. 12. The wire connecting the sensor 110 to the controller 40 may pass through the second through hole 32. In this case, the wire may be exposed to the outside of the cabinet 10.

In this way, because the sensor kit can be fixed to or separated from the cabinet by using the holder or the fixing magnet without having to perform a separate complex coupling task, the sensor kit may be easily installed, repaired, and replaced.

Figure 13:
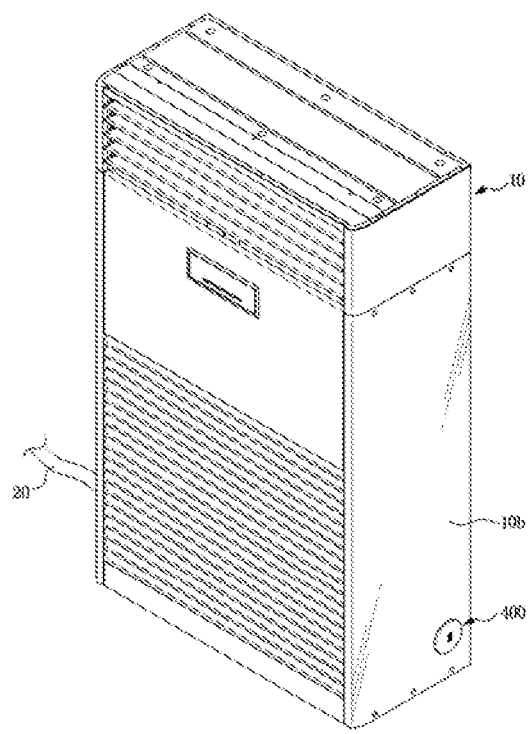
FIG. 13 shows a sensor kit of an air conditioner according to another embodiment of the disclosure according to an embodiment of the disclosure.
Figure 14:
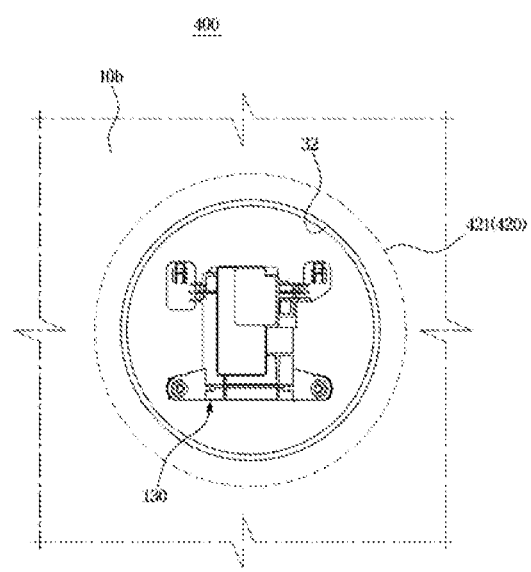
FIG. 14 shows a state in which the sensor kit shown in FIG. 13 is inserted in a through hole according to an embodiment of the disclosure.
Figure 15:
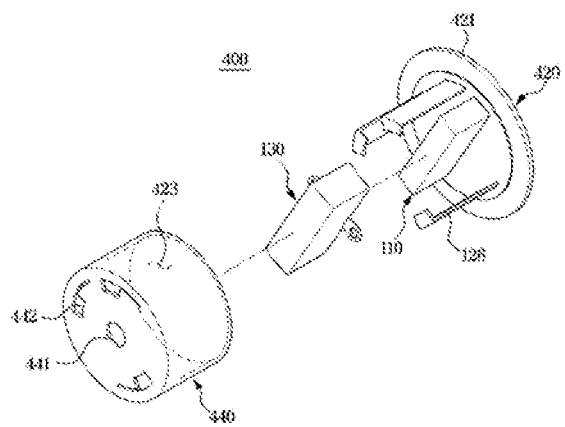
FIG. 15 is an exploded perspective view of the sensor kit shown in FIG. 13 according to an embodiment of the disclosure.
Figure 16:
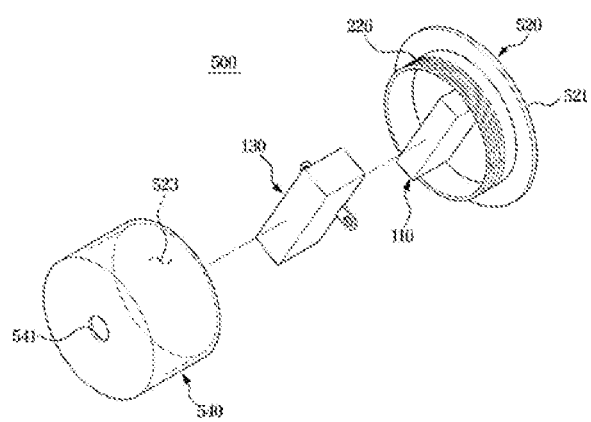
FIG. 16 is an exploded perspective view of a sensor kit of an air conditioner according to another embodiment of the disclosure.

FIG. 13 shows a sensor kit of an air conditioner according to another embodiment of the disclosure. FIG. 14 shows a state in which the sensor kit shown in FIG. 13 is inserted in a through hole. FIG. 15 is an exploded perspective view of the sensor kit shown in FIG. 13. FIG. 16 is an exploded perspective view of a sensor kit of an air conditioner according to another embodiment of the disclosure.

Hereinafter, overlapping descriptions about portions described above are omitted. Also, the following descriptions about overlapping components between a sensor kit 400 shown in FIG. 13 and a sensor kit 500 shown in FIG. 16 may be applied to both the sensor kit 400 and the sensor kit 500.

Cover portions 421 and 521 of covers 420 and 520 may be in a shape of a flat disk to little protrude outward from the second side 10b. A diameter of each of the cover portions 421 and 521 may be greater than that of the second through hole 32.

Accommodating spaces 423 and 523 for accommodating sensors may be respectively formed inside holders 440 and 540. Because the holders 440 and 540 are positioned inside the cabinet 10, the accommodating spaces 423 and 523 may also be positioned inside the cabinet 10.

The accommodating spaces 423 and 523 may be positioned between the covers 420 and 520 and the holders 440 and 540. More specifically, the accommodating spaces 423 and 523 may be surrounded by the cover portions 421 and 521 of the covers 420 and 520 and inner surfaces of the holders 440 and 540. The accommodating spaces 423 and 523 may communicate with an inside space of the cabinet 10 through communicating holes 441 and 541 formed in the holders 440 and 540.

The sensor 110 may be inserted in the second through hole 32 and positioned inside the cabinet 10. More specifically, the sensor 110 may be installed inside the sensor housing 130, the sensor housing 130 in which the sensor 110 is installed may be coupled with the cover portions 421 and 521, and upon coupling of the covers 420 and 520 with the second through hole 32, the sensor housing 130 may be inserted into the second through hole 32.

Coupling portions of the covers 420 and 520 may include the coupling rib 126 or the screw thread 226. In a case in which the coupling rib 126 is provided, a coupling hole 442 corresponding to the coupling rib 126 may be formed in the holder 440.

As such, because the accommodating spaces 423 and 523 and the sensor 110 are positioned inside the cabinet 10, the covers 420 and 520 may little protrude from a side surface of the cabinet 10, and the sensor 110 may be protected inside the cabinet 10.

So far, although the technical concept of the disclosure has been described based on specific embodiments, the scope of rights of the disclosure is not limited to these embodiments. It should be interpreted that various embodiments modified or changed by a person skilled in the art within a scope not deviating from the gist of the disclosure as the technical concept of the disclosure, which is defined in the claims, also belong to the scope of rights of the disclosure.

What is claimed is:

1. An air conditioner comprising:
a cabinet including a first side having a first through hole and a second side having a second through hole;
a pipe formed to pass through the first through hole;
a sensor kit provided on the second side; and
a controller to be electrically connected to the sensor kit,
wherein the sensor kit comprises:
a sensor configured to sense a pollution level of outside air;
a cover formed to cover the second through hole on the second side, and fix the sensor; and
a holder formed to fix the cover to the second side, and the holder comprises a communicating hole formed in one side of the holder,
wherein the cover comprises a coupling portion formed to pass through the second through hole, and
the holder is positioned inside the cabinet and coupled with the coupling portion.

2. The air conditioner of claim 1, wherein the cover comprises an accommodating space formed inside the cover to accommodate the sensor.

3. The air conditioner of claim 2, wherein the accommodating space of the cover is positioned outside the cabinet.

4. The air conditioner of claim 3, wherein the accommodating space of the cover is surrounded by the second side and the cover.

5. The air conditioner of claim 4, wherein the accommodating space of the cover is formed to be connected with an inside of the cabinet through the second through hole.

6. The air conditioner of claim 1,
wherein the holder comprises an accommodating space formed inside the holder to accommodate the sensor.

7. The air conditioner of claim 6, wherein the accommodating space of the holder is positioned inside the cabinet.

8. The air conditioner of claim 7, wherein the accommodating space of the holder is surrounded by the cover and the holder.

9. The air conditioner of claim 6, wherein the holder is positioned inside the cabinet and coupled with the cover.

10. The air conditioner of claim 1, wherein the coupling portion comprises a coupling rib to be inserted in a coupling hole formed in the holder, and
the holder is formed to be coupled with the coupling rib by rotating on a central axis of the holder.

11. The air conditioner of claim 1, wherein the coupling portion comprises a screw thread corresponding to the holder, and
the holder is formed to be coupled with a screw holder by rotating on a central axis of the holder.

12. The air conditioner of claim 1, wherein the first side and the second side face each other, and the first through hole is symmetrical to the second through hole.

13. The air conditioner of claim 1, wherein the sensor is electrically connected to the controller by a wire passing through the communicating hole.

* * * * *